US009426055B2

(12) United States Patent
Cicic et al.

(10) Patent No.: US 9,426,055 B2
(45) Date of Patent: Aug. 23, 2016

(54) NETWORK ROUTING

(75) Inventors: Tarik Cicic, Strømmen (NO); Haakon Bryhni, Oslo (NO); Jan Marius Evang, Dal (NO); Richard Aas, Oslo (NO)

(73) Assignee: MEDIA NETWORK SERVICES AS, Oslo (NO)

( * ) Notice: Subject to any disclaimer, the term of this patent is extended or adjusted under 35 U.S.C. 154(b) by 0 days.

(21) Appl. No.: 13/881,372

(22) PCT Filed: Nov. 1, 2011

(86) PCT No.: PCT/GB2011/052123
§ 371 (c)(1),
(2), (4) Date: May 30, 2013

(87) PCT Pub. No.: WO2012/059749
PCT Pub. Date: May 10, 2012

(65) Prior Publication Data
US 2013/0246654 A1    Sep. 19, 2013

(30) Foreign Application Priority Data
Nov. 1, 2010  (GB) .................................. 1018392.9

(51) Int. Cl.
*H04L 12/721*    (2013.01)
*H04L 12/701*    (2013.01)
(Continued)

(52) U.S. Cl.
CPC ................ *H04L 45/14* (2013.01); *H04L 45/00* (2013.01); *H04L 45/04* (2013.01); *H04L 45/122* (2013.01)

(58) Field of Classification Search
CPC .... H04L 45/00; H04L 29/06; H04L 29/08081

USPC ................................. 709/217–219, 227, 238
See application file for complete search history.

(56) References Cited

U.S. PATENT DOCUMENTS 6,240,462 B1 *  5/2001  Agraharam et al. .......... 709/238
7,103,651 B2     9/2006  Bohannon et al.
(Continued)

FOREIGN PATENT DOCUMENTS

GB         2431818 A       5/2007
WO    WO 2009/084968 A1   7/2009

OTHER PUBLICATIONS

Reynders and Wright, Practical TCP/IP and Ethernet Networking for Industry, pp. 104 and 106, Oct. 14, 2003, Newnes, 2 pages.*
(Continued)

*Primary Examiner* — Brendan Higa
*Assistant Examiner* — Leon Y Tseng
(74) *Attorney, Agent, or Firm* — Withrow & Terranova, P.L.L.C.; Vincent K. Gustafson

(57) ABSTRACT

A relay system has a router and multiple relay servers with specific network addresses on a first network. The router and servers are mutually connected by a second network. The router receives a relay-service request from a source on the first network, addressed to an address distinct from the relay servers' specific addresses. It forwards the request to the relay servers. Each relay server instructs the source to issue a relay-service request to its specific address. The server that receives the request provides the service. Two routers may be connected to different respective sub-networks of the first network and be connected to each other by the second network. The routers announce a common destination network address on the first network. The first network is configured such that only one of the routers receives a data packet addressed to the common address, which it forwards onto the second network.

16 Claims, 3 Drawing Sheets

(51) Int. Cl.
*H04L 12/715* (2013.01)
*H04L 12/733* (2013.01)

(56) References Cited

U.S. PATENT DOCUMENTS

| | | | |
|---|---|---|---|
| 7,512,702 B1* | 3/2009 | Srivastava et al. | 709/238 |
| 7,720,997 B1* | 5/2010 | Gourlay | H04L 12/5692 370/238 |
| 8,725,895 B2* | 5/2014 | Chaturvedi et al. | 709/238 |
| 2002/0112036 A1* | 8/2002 | Bohannon et al. | 709/220 |
| 2005/0108328 A1 | 5/2005 | Berkeland et al. | |
| 2006/0112170 A1 | 5/2006 | Sirkin | |
| 2006/0168145 A1* | 7/2006 | Pitts | 709/219 |
| 2008/0276002 A1* | 11/2008 | Jiang | H04L 45/00 709/241 |
| 2009/0094684 A1* | 4/2009 | Chinnusamy | H04L 63/0281 726/4 |
| 2009/0316708 A1* | 12/2009 | Yahyaoui | H04L 61/2575 370/401 |
| 2010/0268832 A1* | 10/2010 | Lucas et al. | 709/228 |
| 2010/0325309 A1* | 12/2010 | Cicic et al. | 709/238 |

OTHER PUBLICATIONS

Tomulet, How to Turn a Router Into a Proxy Server, Oct. 6, 2010, eHow.com (4 pages).*

International Search Report and Written Opinion corresponding to International Patent Application No. PCT/GB2011/052123 dated Dec. 14, 2011.

Takabatake, T., "A Scheme of Relay Server Selection Methods for NAT Traversal through Home Gateways," Telecommunication Networks and Applications Conference 8 pages (2008).

* cited by examiner

NETWORK ROUTING

CROSS-REFERENCE TO RELATED APPLICATIONS

This application is filed under the provisions of 35 U.S.C. §371 and claims the priority of International Patent Application No. PCT/GB2011/052123 filed on Nov. 1, 2011, and of United Kingdom Patent Application No. 1018392.9 filed on Nov. 1, 2010. The disclosures of the foregoing patent applications are hereby incorporated by reference herein in their respective entireties.

This invention relates to systems and methods for routing data in a network.

The Internet does not provide quality of service (QoS) guarantees, but merely routes packets using a "best effort" approach. Data packets can be delayed or lost completely. This situation can result in inadequate performance, especially when using real-time Internet services such as videoconferencing, when it is not possible to hold large data buffers or to tolerate delays due to the retransmission of lost packets.

WO 2009/084967 and WO 2009/084968, by the present Applicant, recognise this problem and describe architectures for improving the quality of service provided to a user of a network service. They describe a dedicated transport network comprising retransmission devices (routers or transport relays) located at multiple points of presence (PoPs) and internally connected by guaranteed bandwidth channels which are owned or rented from transport providers. The network is connected to multiple Internet Service Providers (ISPs) so that time-sensitive traffic can be routed from an ISP via the guaranteed channels, lessening or negating the need for it to travel over delay-prone Internet connections.

Packets that are time-sensitive can be directed to a retransmission device in the dedicated transport network using a mapping between a destination address space and the addresses of the re-transmission devices in the dedicated network. This mapping may use the Border Gateway Protocol (BGP) and can be based on network distance or current network load in the transport network. The mapping is stored in one or more control servers, accessible by a forwarding device in the user's local network.

The Applicant now recognises that there may be circumstances in which use of such a mapping to redirect traffic to the dedicated transport network is not the best approach. For example, such an arrangement may make it difficult to respond to temporal network factors such as high traffic loads and broken links between the user and the dedicated transport network. This approach also requires there to be communication between the control server and the selective forwarding device or endpoint control system so as to distribute the mapping information, resulting in a communication overhead.

The present invention seeks to give further improvements. When viewed from a first aspect, the invention provides a system for routing data, comprising two routers connected to different respective sub-networks of a first network, said two routers also being connected to each other by a second network, wherein each router is configured to:
  announce on the first network a destination network address common to both routers;
  receive a data packet addressed to the common destination network address; and
  forward the packet along a connection on the second network, wherein the first network is configured such that only one of the routers receives the data packet addressed to the common network address.

The invention extends to a method of routing data using first and second routers that are connected to different respective sub-networks of a first network and that are connected to each other by a second network, the method comprising:
  each router announcing on the first network a destination network address common to both routers;
  only the first router receiving a data packet addressed to the common destination network address; and
  the first router forwarding the packet along a connection on the second network.

The invention further extends to a router configured to implement the invention.

It will be appreciated by the skilled person that, with such a system or method, for a packet which is to be transported over the second network, a communicating party need only direct the packet to a single, common router address. There is therefore no need to maintain a mapping that identifies which of the routers a packet should be forwarded to, thereby resulting in reduced communication overheads.

Moreover, if one of the routers becomes unavailable (for example, because of a fault), the data packet can still be delivered to the other router, rather than being lost or returned as undeliverable. This provides advantageous fault resilience.

A router is a device that interfaces between two networks by routing data packets it receives from one network onto the other network.

The first and second networks may be of any suitable type. In a set of embodiments the first network is a public network, e.g. the Internet. The data packet routes between the networks are preferably exchanged using the Border Gateway Protocol (BGP).

In a set of embodiments the second network is a private network, e.g. one having access control. Such access control could, for example, take the form of a password, key or the like; or could comprise identity authentication, e.g. by means of an IP address or the like.

One of the routers may forward the packet over the second network to the other router. That other router may then forward the packet over the first network to a destination.

The first network is preferably arranged such that the data packet addressed to the common network address is received at the router that is closer (or closest, if there are more than two such routers) to the source of the data packet, according to a proximity metric. This proximity metric may be explicitly calculated in a routing step, or may be implicit from the way the first network is constructed. The notion of a closest router could relate to one or more factors such as geographical proximity, shortest path, least latency, least load, etc. Because the data packet will travel from the source to the "nearest" router, it will typically reach the second network more quickly than would be the case if a static router mapping were used or if the mapping to an individual router were only updated relatively slowly. Arrangements in accordance with the invention can be responsive to increased load on the first, e.g. public network, since such loading can be used to determine which router receives the packet.

The second or private network may, in some embodiments, be any network to which admission control is applied, as described in WO 2009/084967. It is typically connected to the first, e.g. public, network at various Points of Presence (PoPs), such as Internet exchange points (IXPs).

The second network preferably comprises one or more links between routers that support a guaranteed quality of service (QoS); for example, that offer a guaranteed maximum latency, minimum bandwidth for traffic, maximum jitter, or maximum packet loss. In this way, time-sensitive traffic such as telephony data can be routed onto fast links within the second network for at least some of its journey. Embodiments of the present invention can thereby minimise any time that the traffic has to spend on potentially lower-quality public links by providing easy access to a dedicated transport network. The two routers may be connected by any number of intermediate nodes on the second network; in some embodiments, the shortest path between the two routers on the second network may comprise at least two or more intermediate nodes.

Of course, the system is not limited to just two routers, and may comprise any number of further routers similarly configured.

The first network is preferably an Internet Protocol (IP) network. The two routers may be located on different respective IP sub-networks (IP subnets). These sub-networks may, for example, be different Internet Service Provider networks (ISPs).

The routers being connected to different respective sub-networks of the first network would normally entail the two routers having connections to distinct physical networks which are in turn connected to the rest of the first network through respective gateways. The two routers may, for example, be situated on different respective Ethernet networks or Ethernet network segments, or on different respective broadcast domains. However, more generally, the sub-networks could be determined as logical subdivisions of an addressing space within the first network; for example, with all nodes in one of the sub-networks sharing the same value for a predetermined number (e.g. 18 or 24) of the most-significant bits of their respective network address on the first network.

Each router may be configured to receive a data packet addressed to the common destination network address at an input connected to its respective sub-network. The data packet could originate from a node on the sub-network, or it may pass through the sub-network.

The routers will typically be located some distance away from each other; e.g. on different sites, which may be tens, hundreds or thousands of kilometers apart. In some preferred embodiments, the two routers are separated by at least ten kilometers. In this way, a user in Paris, France can, for example, enjoy high-quality video-conferencing with a user in Tokyo, Japan, with traffic from each user joining a bandwidth-guaranteed private transport network at the closest Point of Presence (PoP) of the private network to each user. These PoPs may be peered with the user's own ISP, but this is not essential and they may instead be peered with another ISP or Internet backbone provider that is relatively close to the user.

In some embodiments, the data packets sent to the common destination address comprise audio or image content. However, in other embodiments, the data packet comprises a request to a relay server on the second network. The relay server may, for example, be a Traversal Using Relays around NAT (TURN) server, which allows a host situated behind a Network Address Translation (NAT) gateway to exchange packets with other hosts, which may or may not also be behind NAT gateways. The data packet may then comprise a TURN "Allocate" request.

One of the routers may be connected to one or more relay servers on the second, or private, network. The router and relay server or servers may be located at a single Point of Presence (PoP) and may be on the same Local Area Network (LAN). They may be situated on the same physical site or in the same building and may share connections to ISPs.

The router may be configured to communicate a relay-server request to two or more relay servers to which it is connected. This may be achieved by a static mapping, in the router, of the common destination network address to a broadcast address for the connected relay servers. For example, data packets addressed to the common network address may be mapped to the Ethernet broadcast address. This can be achieved, for example, by the router comprising a static Address Resolution Protocol (ARP) entry from the common address to FF:FF:FF:FF:FF:FF. In this way each packet received by the router is broadcast over the router's LAN and can be received by each directly connected relay server.

Advantageously, each of the relay servers that receives the request responds by issuing a reply that provides its specific network address. The reply preferably comprises an instruction to reissue or redirect a relay-server request to the relay server's network address. This "redirect" server reply is preferably sent to a source of the incoming data packet (which may, for example, be a component of a video-conferencing client). When using TURN, for example, each server may issue a rejection of the Allocate request by sending a "300 (Try Alternate)" error specifying its own public network address as an "ALTERNATE-SERVER" attribute.

Such an arrangement is desirable as it acts as a load-balancing mechanism across the relay servers. Moreover, it does so in a way that can be transparent to the client and therefore doesn't require any special reconfiguration of the client; for example, when the relay servers are TURN servers, a standard TURN client can be used without any special configuration. The load-balancing works because, at the time the relay-server request is received at the router, the relay servers will typically have different processing and bandwidth loads and will therefore respond to the relay-server request with varying quickness. In general, the most lightly-loaded relay server will be able to respond quickest, and its redirect reply should therefore be received first at the source of the relay-server request.

When the source of the data packet (e.g. a TURN client) receives the first redirect reply (e.g. the first rejection of the TURN Allocate request), it will typically reissue the relay request, this time addressed not to the common network address but to the address of the specific relay server that responded the quickest. Later-arriving redirect replies from the other relay servers will be ignored. When using the TURN or Session Traversal Utilities for NAT (STUN) standard, no special configuration is needed for such later replies to be ignored.

From then on, the client can communicate over the second network using the specific relay server, which should typically be the server that can most easily accommodate the new traffic. Such communication may, for example, comprise video-conferencing data packets.

Load-balancing between multiple TURN servers at a PoP is particularly advantageous for high-data-rate applications such as video-conferencing, since such applications can place a large burden on a TURN server which could otherwise result in unacceptable delays.

A further benefit of this arrangement is that it provides resilience against one of the relay servers failing. In such a circumstance, the LAN broadcast message will still be received at the other servers on the LAN, which will respond as before. New connections will be shared between the remaining functioning servers due to the inherent load-balancing characteristics of the architecture. Failure of one of the relay servers is thus elegantly addressed by the design of the system.

Although this combined use of a common destination network address (to find a PoP on a guaranteed-bandwidth network closest to the client) and LAN broadcast (to initiate a "race" between multiple relay servers), results in a particularly advantageous minimising of latency and improvement in resilience, the idea of broadcasting to multiple relay servers is new and inventive in its own right.

Thus from a further aspect the invention provides a system for providing a relay service comprising a router on a first network and two or more relay servers, each relay server having a specific network address, and the router and relay servers being mutually connected by a second network, wherein the router is configured to:

receive, from a source on the first network, a request for a relay service addressed to a network address that is distinct from the specific addresses of the relay servers; and forward the relay service request to the relay servers, and wherein each relay server is configured to:

receive the relay service request from the router;

issue a response addressed to the source comprising an instruction to the source to issue a relay service request addressed to the specific address of the respective relay server; and respond to a relay service request addressed to its specific address by providing the requested relay service.

This aspect extends to a method of providing a relay service using a router on a first network and two or more relay servers, each relay server having a specific network address, and the router and relay servers being mutually connected by a second network, the method comprising:

the router receiving, from a source on the first network, a request for a relay service addressed to a network address that is distinct from the specific addresses of the relay servers;

the router forwarding the relay service request to the relay servers;

each relay server receiving the relay service request from the router;

each relay server issuing a response addressed to the source comprising an instruction to the source to issue a relay service request addressed to the specific address of the respective relay server; and one of the relay servers responding to a relay service request addressed to its specific address by providing the requested relay service.

The invention also extends to a router configured to be connected to a first network and to two or more relay servers by a second network, each relay server having a specific network address, the router being further configured to receive, from a source on the first network, a request for a relay service addressed to a network address that is distinct from the specific addresses of the relay servers; and to forward the relay service request to both relay servers.

The invention further extends to a relay server configured to implement the invention.

Thus, as previously explained, a request for a relay service can be passed to multiple relay servers, all of which respond to the request. However, the response of the server with most processing or network capacity is likely to be received first by the requester. This response causes the requester to redirect the relay request to the specific server, and then to receive the requested service from that server. This advantageously provides a degree of intrinsic load-balancing between the relay servers.

The first network is preferably a relatively wide area network, such as the Internet (i.e. one operating under Internet Protocol) and the second network is preferably a relatively local area network, such as an Ethernet network. The router and relay servers are preferably connected by a private network, e.g. one having access control as previously defined hereinabove. The router is preferably connected to other, similarly-configured routers, by a network having connections with QoS guarantees; however, this is not essential. These other routers will typically be located some distance away from the first router; e.g. on a different site, for example tens, hundreds or thousands of kilometers away.

The specific address of each relay server is preferably unique on the first network, e.g. it has a globally-unique IP address.

Any appropriate relay protocol can be used that has a mechanism whereby a server can instruct a source to communicate with the server using a specific network address. Typically the protocol should support connectionless communication, e.g. using User Datagram Protocol (UDP) messaging. In one preferred set of embodiments, the relay servers are TURN servers. However, they could be STUN or other suitable servers.

Optional and preferred features of any aspect of the invention may be optional or preferred features of any other aspect.

The router and relay servers may be connected by a wireless network, or by a wired network such as an Ethernet network. The network address that is distinct from the specific addresses of the relay servers may be an a common destination network address; for example, the system may comprise one or more additional routers which are configured to receive and process packets addressed to the same network address.

The router may access a mapping between destination addresses of incoming packets and local network addresses. For example, it may access an ARP table mapping IP addresses to Media Access Control (MAC) addresses. The relay service request may be forwarded to both relay servers by being sent to a broadcast address associated with both servers. In some embodiments, an ARP table contains an entry mapping the distinct network address to the broadcast address.

In some embodiments, the two routers need not necessarily be connected to respective sub-networks, and thus, from another aspect, the invention provides a system for routing data, comprising two routers connected to a first network said two routers also being connected to each other by a second network, wherein each router is configured to:

announce on the first network a destination network address common to both routers;

receive a data packet addressed to the common destination network address; and forward the packet along a connection on the second network, wherein the first network is configured such that only one of the routers receives the data packet addressed to the common network address.

The invention extends to a method of routing data using first and second routers that are connected to a first network and that are connected to each other by a second network, the method comprising:

each router announcing on the first network a destination network address common to both routers;

only the first router receiving a data packet addressed to the common destination network address; and the first router forwarding the packet along a connection on the second network.

Certain preferred embodiments of the invention will now be described, by way of example only, with reference to the accompanying drawings, in which.

Figure 1:
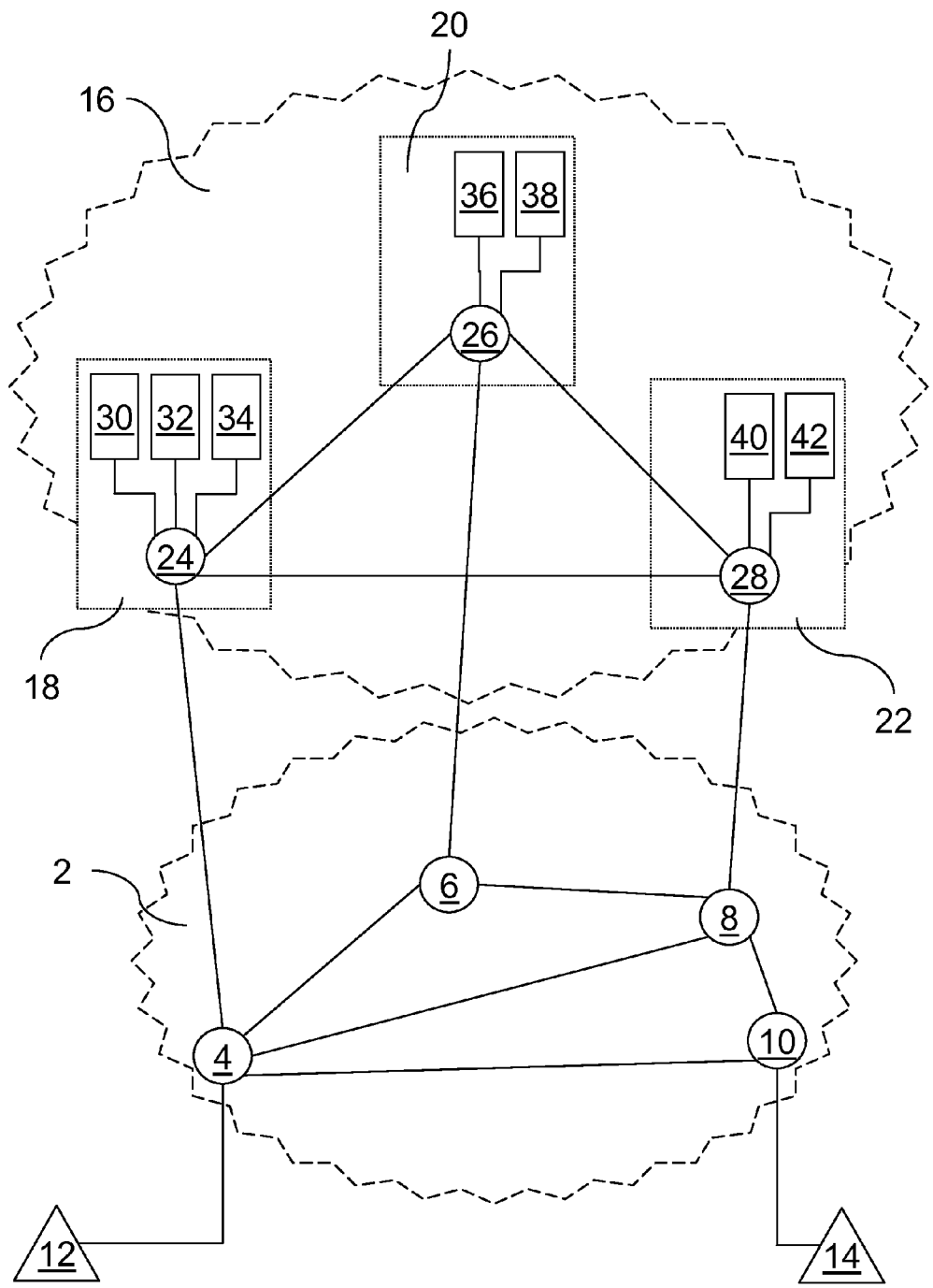
FIG. 1 is a figurative diagram of a network embodying the invention in which one user's ISP peers with a private transport network.

FIG. 1 shows a part of the Internet 2 comprising a first ISP 4, a second ISP 6, a third ISP 8, and a fourth ISP 10. Connections linking these may pass through any number of other ISPs (not shown) and may span considerable distances, e.g. thousands of miles. Figurative links between the ISPs are shown, but many other possible connecting paths would typically also exist.

A first customer network 12 is connected to the Internet via the first ISP 4. A second customer network 14 is connected to the Internet via the fourth ISP 10. Each of these customer networks 12, 14 may be corporate or domestic networks. Each might be behind a NAT gateway.

Because the route between the first customer's ISP 4 and the second customer's ISP 10 over the Internet 2 does not provide any QoS guarantees and may be heavily loaded with other traffic, it would typically provide unacceptable delays to real-time peer-to-peer traffic between the two customers 12, 14. Such delays might typically occur during a H.323 or Session Initiation Protocol (SIP) videoconferencing exchange.

These delays can be reduced or avoided by routing such traffic over a dedicated transport network 16. The network is privately run and admits traffic from authorised customers. It connects to the Internet at various Points of Presence (PoPs), which are distributed geographically (for example, one may be in the United Kingdom, one in Germany, one in Japan, and one on the west coast of the United States, and one on the east coast of the United States). Each PoP is typically located at a single site, e.g. at an Internet exchange point (IXP), but they might be distributed across multiple sites.

FIG. 1 shows representatively a first PoP 18, a second PoP 20 and a third PoP 22, which are peered respectively with the first ISP 4, the second ISP 6 and the third ISP 8. Of course, each PoP may have multiple peering arrangements.

These PoPs 18, 20, 22 each have at least one router 24, 26, 28. The router 24 at the first PoP 18 is connected to first, second and third TURN servers 30, 32, 34 by a local Ethernet network in the PoP. The router 26 at the second PoP 20 is connected to local respective first and second TURN servers 36, 38, while the router 28 at the third PoP 22 is also connected locally to respective first and second TURN servers 40, 42.

The three PoPs 24, 26, 28 each announce the same common destination network address prefix e.g. 1.2.3.0/23, to all Border Gateway Protocol (BGP) peers. A single address, e.g. 1.2.3.4 is allocated as a global TURN service address. Internally within the PoP, each server 30-42 has its own specific address.

Figure 2:
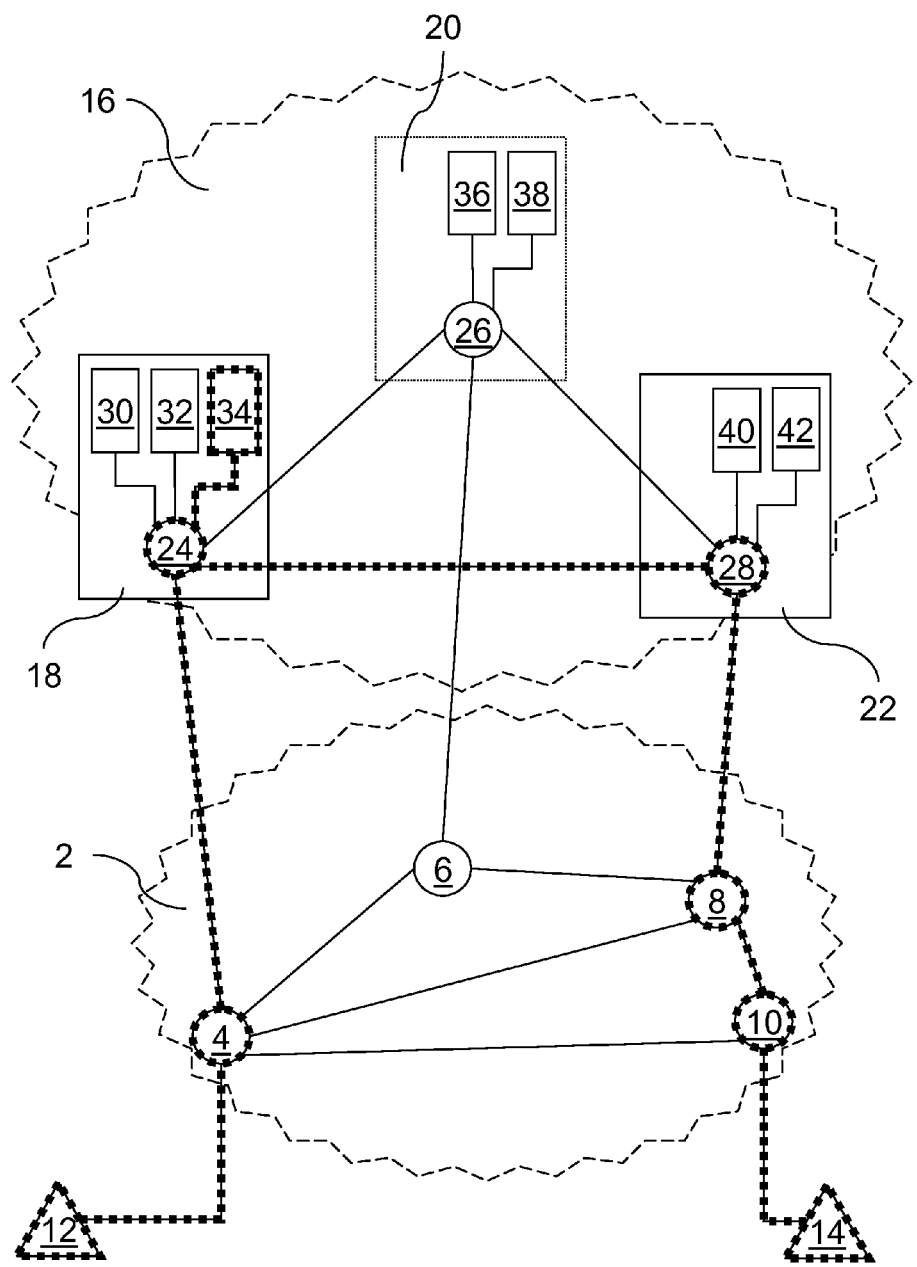
FIG. 2 is a figurative diagram showing active components during a data transfer.

FIG. 2 shows the active components in a communication session, such as an H.323 video call, between the first customer 12 and the second customer 14. A centralised or distributed control server (not shown) may be used to initiate the call, using methods familiar to one skilled in the art. The present example focuses on those aspects of the flow of data between the two peers that is non-standard.

The video call client at the first customer 12 is configured to send a TURN request to the global TURN service address 1.2.3.4. Because of the nature of the BGP routing used in the Internet 2, this request will be received only at the closest PoP 18 (according to the network metric) to the first customer's ISP 4.

The router 24 of the closest, first PoP 18 receives the TURN request and looks up the destination IP address 1.2.3.4 in an ARP table. This table contains the static mapping "1.2.3.4→FF:FF:FF:FF:FF:FF", which causes the router 24 to broadcast the received packet on the PoP's local area network (LAN).

All the TURN servers 30-42 are configured with address 1.2.3.4 in addition to their specific IP addresses 1.2.a.b. Each server is configured to reply to the TURN request with a "300 (Try Alternate)" error specifying its own specific network address as an "ALTERNATE-SERVER" attribute. For the sake of the example in FIG. 2, it is assumed that the third server 34 at the first PoP 18 is serving fewer active connections at the time it receives the broadcast request, and is therefore able to respond in shorter time than the first and second servers 30, 32. Its response is therefore received first by the client at the first customer's 12 site.

The response causes the first customer's client to reissue the TURN request, this time addressed to the specific address 1.2...a.z of the third server 34. This request is received by the router 24 at the first PoP 18, which passes it on over the local Ethernet network to the third server 34.

Subsequently-received redirect instructions from the other servers 30, 32 are ignored by the client, in accordance with the standard protocols. In this way, the least-loaded server 34 is utilised to host the TURN session.

The third server 34 responds in accordance with normal TURN protocol, and a session is established between it and the first customer 12. The second customer 14 is made aware of the address of the TURN server 34 using methods known in the art and the video between the parties is established. During the call, call data is routed from the first customer 12, through his ISP 4, to the closest PoP 24 of the private transport network 16, along QoS guaranteed channels in the private network 16 to the PoP 22 closest to the second customer 14. In the example of FIG. 2, the second customer's ISP 10 does not have a direct peering agreement with the private transport network provider, but is connected to a nearby ISP 8 that does have such an agreement. Although video call traffic has to travel over a non-guaranteed link between these two ISPs 8, 10, these would typically be located geographically close to one another, e.g. in the same country, and the overall result is a minimising of the time for which traffic between the two customers 12, 14 is exposed to non-bandwidth-guaranteed links.

Figure 3:
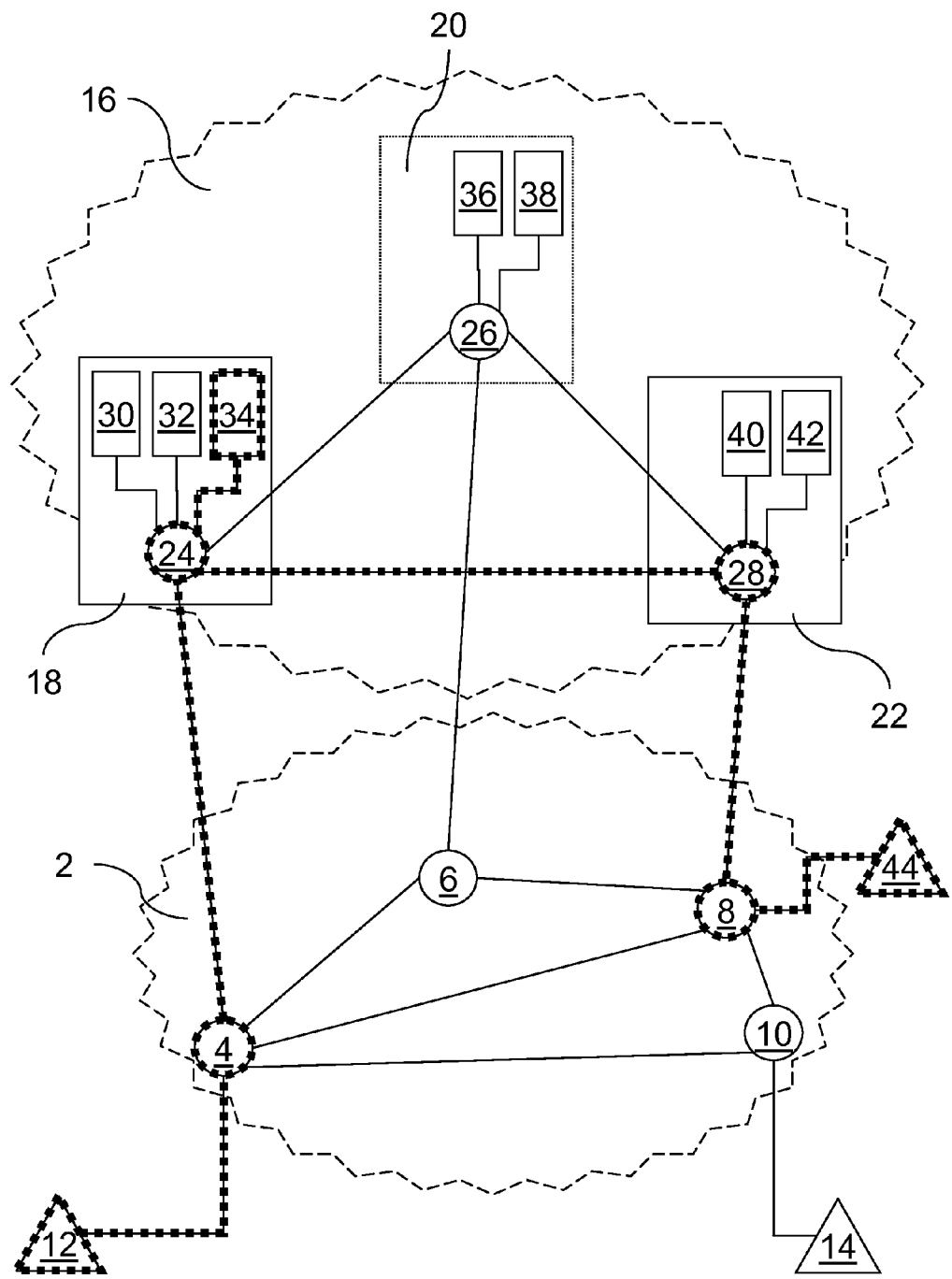
FIG. 3 is a figurative diagram in which two users' ISPs peer with the private transport network.

FIG. 3 shows communication between the first customer 12 and a third customer 44 whose ISP 8 is peered directly with the private transport network 16. In this case, data packets need not be exposed to any delays on the public Internet 2.

The use of the TURN server 34 allows on-demand peer-to-peer calls between the two customer networks 12, 14 even when both of them are behind symmetric NAT gateways.

Where the customer networks are not behind such restrictive gateways or firewalls, the use of a TURN server is nonetheless advantageous in ensuring traffic enters the private transport network 16 at the closest point to the customer.

The invention claimed is:

1. A system for providing a relay service, comprising:
a router on the Internet; and a plurality of relay servers, each relay server of the plurality of relay servers having a specific IP address, and the router and the plurality of relay servers being mutually connected by a local area network, wherein the router is configured to:
 receive, from a source on the Internet, a first relay service request addressed to an IP address that is distinct from the specific IP addresses of the plurality of relay servers; and
 forward the first relay service request to two or more relay servers of the plurality of relay servers, wherein each relay server of the two or more relay servers is configured to:
 receive the first relay service request from the router; and
 issue a respective response addressed to the source on the Internet comprising an instruction to the source on the Internet to issue a further relay service request addressed to the specific IP address of the relay server, so as to provide load-balancing, between the two or more relay servers by causing the source on the Internet to issue a second relay service request addressed to the specific IP address of a relay server of the two or more relay servers whose response, among the respective responses, is received first by the source on the Internet; and wherein the relay server whose response is received first by the source on the Internet is further configured to receive said second relay service request and to respond by providing a requested relay service.

2. The system of claim 1, wherein the router is connected to other routers by a network comprising one or more links between routers that support a guaranteed quality of service.

3. The system of claim 2, wherein the network supporting a guaranteed quality of service is a private network having access control.

4. The system of claim 1, wherein the specific IP address of each relay server is unique on the Internet.

5. The system of claim 1, wherein the plurality of relay servers are TURN (Traversal Using Relays around Network Address Translation) servers.

6. The system of claim 1, wherein the router is configured to access a mapping between destination IP addresses of incoming packets from the Internet and local network addresses on the local area network.

7. The system of claim 1, wherein the router is configured to forward the first relay service request to the two or more relay servers by sending the first relay service request to a common broadcast address for the two or more relay servers.

8. The system of claim 1, wherein the router is configured to access an ARP (Address Resolution Protocol) table that maps IP (Internet Protocol) addresses to MAC (Media Access Control) addresses, and wherein the ARP table contains an entry that maps (i) the IP address that is distinct from the specific IP addresses of the plurality of relay servers to (ii) a broadcast MAC address.

9. The system of claim 1, wherein the router on the Internet is a first router, and the system further comprises one or more additional routers that are configured to receive and process packets addressed to said IP address that is distinct from the specific IP addresses of the plurality of relay servers.

10. A method of providing a relay service using a router on the Internet and a plurality of relay servers, each relay server of the plurality of relay servers having a specific IP address, and the router and the plurality of relay servers being mutually connected by a local area network, the method comprising:
 the router receiving, from a source on the Internet; a first relay service request addressed to an IP address that is distinct from the specific IP addresses of the plurality of relay servers;
 the router forwarding the first relay service request to two or more relay servers of the plurality of relay servers;
 each relay server of the two or more relay servers receiving the first relay service request from the router;
 each relay server of the two or more relay servers issuing a respective response addressed to the source on the Internet comprising an instruction to the source on the Internet to issue a further relay service request addressed to the specific IP address of the respective relay server, so as to provide load-balancing between the two or more relay servers by causing the source on the Internet to issue a second relay service request addressed to the specific IP address of a relay server of the two or more relay servers whose response, among the respective responses, is received first by the source on the Internet; and
 the relay server whose response is received first by the source on the Internet receiving said second relay service request and responding by providing a requested relay service.

11. The method of claim 10, further comprising the source on the Internet:
 receiving a first instruction to issue a further relay service request to the specific IP address of a relay server of the two or more relay servers;
 later receiving one or more later-received instructions to issue further relay service requests to the specific IP addresses of one or more other respective relay servers of the two or more relay servers;
 issuing the second relay service request in response to the first instruction; and
 ignoring the one or more later-received instructions.

12. The method of claim 10, wherein the router is connected to other routers by a private network having access control, and wherein said private network comprises one or more links between routers that support a guaranteed quality of service.

13. The method of claim 10, wherein the plurality of relay servers are TURN (Traversal Using Relays around Network Address Translation) servers.

14. The method of claim 10, further comprising the router accessing a mapping between destination IP addresses of incoming packets from the Internet and local network addresses on the local area network.

15. The method of claim 10, further comprising the router forwarding the first relay service request to each relay server of the two or more relay servers by sending the first relay service request to a common broadcast address for the two or more relay servers.

16. The method of claim 10, further comprising the router accessing an ARP (Address Resolution Protocol) table that maps IP (Internet Protocol) addresses to MAC (Media Access Control) addresses, wherein the ARP table contains an entry that maps (i) the IP address that is distinct from the specific IP addresses of the plurality of relay servers to (ii) a broadcast MAC address.

* * * * *